(12) United States Patent
Jha et al.

(10) Patent No.: US 11,565,826 B2
(45) Date of Patent: Jan. 31, 2023

(54) NAVIGATION LIGHT SYSTEM FOR AN UNMANNED AERIAL VEHICLE, UNMANNED AERIAL VEHICLE, AND METHOD OF OPERATING A NAVIGATION LIGHT SYSTEM OF AN UNMANNED AERIAL VEHICLE

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 61 days.

(21) Appl. No.: 17/156,800

(22) Filed: Jan. 25, 2021

(65) Prior Publication Data
US 2021/0276730 A1 Sep. 9, 2021

(30) Foreign Application Priority Data
Jan. 24, 2020 (EP) ..................................... 20153743

(51) Int. Cl.
*B64D 47/02* (2006.01)
*H05B 47/105* (2020.01)
*B64C 39/02* (2006.01)

(52) U.S. Cl.
CPC ............ *B64D 47/02* (2013.01); *B64C 39/024* (2013.01); *H05B 47/105* (2020.01); *B64C 2201/027* (2013.01)

(58) Field of Classification Search
None
See application file for complete search history.

(56) References Cited

U.S. PATENT DOCUMENTS

| 7,118,261 B2 | 10/2006 | Fredericks et al. |
| 8,662,721 B2 * | 3/2014 | Calvin .................. B64D 47/06 362/333 |

(Continued)

FOREIGN PATENT DOCUMENTS

| EP | 3072819 A1 * | 9/2016 | ............. B64D 47/06 |
| EP | 3072819 A1 | 9/2016 | |

(Continued)

OTHER PUBLICATIONS

Extended European Search Report for International Application No. 201531743.8 dated Aug. 5, 2020, 52 pages.

*Primary Examiner* — Dedei K Hammond
(74) *Attorney, Agent, or Firm* — Cantor Colburn LLP

(57) ABSTRACT

A navigation light system for an unmanned aerial vehicle, such as a multicopter type unmanned aerial vehicle, includes: a plurality of light emission units. E of the plurality of light emission units has a unit-specific light emission direction and is configured to provide a light output around the unit-specific light emission direction. Each of the plurality of light emission units includes a multi-color light source capable of emitting red light, green light, and white light. The plurality of light emission units are arranged to jointly provide a navigation light pattern around the unmanned aerial vehicle and wherein the light outputs of adjacent light emission units have an overlap the navigation light system is configured to operate each of the plurality of light emission units depending on a relation between a momentary flight direction of the unmanned aerial vehicle and the respective unit-specific light emission direction.

16 Claims, 7 Drawing Sheets

(56) References Cited

U.S. PATENT DOCUMENTS

| | | |
|---|---|---|
| 9,850,003 B2 | 12/2017 | Schoen et al. |
| 10,189,579 B2 | 1/2019 | Hessling-Von Heimendahl |
| 2019/0219247 A1 | 7/2019 | Mayollet |

FOREIGN PATENT DOCUMENTS

| | | |
|---|---|---|
| JP | 6586257 B1 | 10/2019 |
| WO | 2008135927 A1 | 11/2008 |
| WO | 2011106661 A1 | 9/2011 |

* cited by examiner

NAVIGATION LIGHT SYSTEM FOR AN UNMANNED AERIAL VEHICLE, UNMANNED AERIAL VEHICLE, AND METHOD OF OPERATING A NAVIGATION LIGHT SYSTEM OF AN UNMANNED AERIAL VEHICLE

FOREIGN PRIORITY

This application claims priority to European Patent Application No. 20153743.8 filed Jan. 24, 2020, the entire contents of which is incorporated herein by reference.

TECHNICAL FIELD

The present invention is in the field of unmanned aerial vehicles (UAVs). In particular, the present invention is in the field of lighting systems for unmanned aerial vehicles.

BACKGROUND

Recently, the use of unmanned aerial vehicles/drones has increased significantly. Advances in the control and coordination of multiple rotors have made multicopters, in particular unmanned aerial vehicles (UAVs) of this kind, significantly more accessible and more reliable. A particularly popular kind of an unmanned aerial vehicle of the multicopter type is a quadrocopter. Various types of unmanned aerial vehicles have been developed, e.g. for recreational purposes, for carrying cameras, etc. Multicopters are further envisioned for the delivery of goods, for other kinds of courier services, and even for transporting people. With the envisioned increase in unmanned/un-piloted aerial vehicle traffic, flight safety is likely to become an increasing concern.

Accordingly, it would be beneficial to provide a method and a system for increasing the flight safety of unmanned aerial vehicles.

SUMMARY

Exemplary embodiments of the invention include a navigation light system for an unmanned aerial vehicle, comprising: a plurality of light emission units, wherein each of the plurality of light emission units has a unit-specific light emission direction and is configured to provide a light output around the unit-specific light emission direction and wherein each of the plurality of light emission units comprises a multi-color light source capable of emitting red light, green light, and white light; wherein the plurality of light emission units are arranged to jointly provide a navigation light pattern around the unmanned aerial vehicle and wherein the light outputs of adjacent light emission units have an overlap; and wherein the navigation light system is configured to operate each of the plurality of light emission units depending on a relation between a momentary flight direction of the unmanned aerial vehicle and the respective unit-specific light emission direction, with the navigation light pattern around the unmanned aerial vehicle providing a red sector, a green sector, and a white sector in accordance with the momentary flight direction of the unmanned aerial vehicle and with the overlap of the light outputs of adjacent light emission units at a border between the red sector and the green sector providing a white flight direction indicator light output.

Exemplary embodiments of the invention allow for providing a navigation light system for an unmanned aerial vehicle and for integrating an effective visual flight direction indication into the navigation light system. Unmanned aerial vehicles (UAVs), in particular UAVs of the multicopter type, are often capable of flying in arbitrary directions in the UAV frame of reference. In other words, many UAVs are not bound to flying in a nominal forward direction, such as for example an air plane is. With the navigation light system in accordance with exemplary embodiments of the invention being configured to operate the plurality of light emission units depending on the momentary flight direction of the UAV, the navigation light pattern around the UAV may always be provided in accordance with the momentary flight direction of the UAV. The navigation light system may, for any given momentary flight direction, provide a red left forward navigation light output, a green right forward navigation light output, and a white rear navigation light output. The navigation light system may provide for a navigation light pattern around the UAV that is in line with the navigation light output that observers may be used to from manned aerial vehicles, such as from recreational air planes or commercial passenger air planes. Observers of a UAV, having a navigation light system according to exemplary embodiments of the invention, may at any time deduce the travelling direction of the UAV, thus providing for enhanced flight safety in the air space around the UAV.

In addition, the white flight direction indicator light output, provided at the border between the red sector and the green sector, i.e. provided around the momentary flight direction of the UAV, may provide for enhanced awareness of the UAV. Other persons, such as operators of other aerial vehicles or any other kind of people who happen to be in the direction the UAV is headed to, are provided with a visual alert that a UAV is headed their way. The white flight direction indicator light output is an alert to other persons that a UAV may be on a collision course towards them. The overlap between light outputs of adjacent light emission units allows for the white flight direction indicator light output to be always in/around the momentary flight direction of the UAV. Due to color mixing, the overlap of the red and green light outputs of the adjacent light emission units allows for the flight direction indicator light output to be white and, thus, to be clearly distinguishable from the red and green sectors, without the need to provide a dedicated white light output around the momentary flight direction. The navigation light system may integrate red, green, and white navigation lighting with a white flight direction indicator, with both of these functionalities being provided in accordance with the momentary flight direction of the UAV, with both of these functionalities being based on the momentary flight direction in a convenient manner due to the overlap of the light outputs of adjacent light emission units, and with both of these functionalities enhancing the flight safety in the air space around the UAV.

Each of the plurality of light emission units comprises a multi-color light source capable of emitting red light, green light, and white light. Each of the plurality of light emission units may comprise a multi-color light source that can be selectively operated to emit red light and/or green light and/or white light. At any given time, the light output of each of the plurality of light emission units may be a red light output, a green light output, or a white light output. The green light may be aviation green light, the red light may be aviation red light, and the white light may be aviation white light, as defined in Federal Aviation Regulations (FAR) section 25.1397.

Each of the plurality of light emission units comprises a multi-color light source capable of emitting red light, green light, and white light. The multi-color light source may comprise a red LED, a green LED, and a white LED.

The plurality of light emission units are arranged to jointly provide a navigation light pattern around the unmanned aerial vehicle. The navigation light pattern is a 360° navigation light pattern around the unmanned aerial vehicle in a horizontal plane. The horizontal plane may be a horizontal plane in the UAV frame of reference, when the UAV is oriented in the nominal flight position, i.e. in the absence of a pitch angle.

The navigation light pattern around the UAV provides a red sector, a green sector, and a white sector in accordance with the momentary flight direction of the UAV. The red, green, and white sectors may be in accordance with aviation regulations and/or standards for the light distribution of navigation lights, also referred to as position lights, such as given in Federal Aviation Regulations (FAR) sections 25.1387, 25.1389, 25.1391, 25.1393, 25.1395. The term sector in the red sector, the green sector, and the white sector may refer to a sector of the 360° navigation light pattern in the horizontal plane. The red sector, the green sector, and the white sector may also be referred to as a red left forward sector, a green right forward sector, and a white rear sector of the navigation light pattern. The red left forward sector and the green right forward sector may extend in an angular range between 0° and 110° with respect to the momentary flight direction of the UAV and the white rear sector may extend 70° towards the right and left of the momentary rearward direction of the UAV, as is in accordance with FAR section 25.1387, with the overlap exceptions of FAR section 25.1395 being allowed.

The navigation light system is configured to operate each of the plurality of light emission units depending on a relation between a momentary flight direction of the UAV and the respective unit-specific light emission direction. The momentary flight direction and the unit-specific light emission directions are defined in the same frame of reference. For example, the momentary flight direction and the unit-specific light emission directions may be defined in the UAV frame of reference. Further in particular, the momentary flight direction and the unit-specific light emission directions may be measured in the horizontal plane, i.e. their projections onto the horizontal plane may be used for determining the momentarily suitable operation of the plurality of light emission units.

The navigation light system is configured to operate each of the plurality of light emission units depending on a relation between a momentary flight direction of the unmanned aerial vehicle and the respective unit-specific light emission direction, with the overlap of the light outputs of adjacent light emission units at a border between the red sector and the green sector providing a white flight direction indicator light output. The adjacent light emission units may be two light emission units. In particular, the adjacent light emission units may be those two light emission units, whose unit-specific light emission directions are closest to the momentary flight direction. The two unit-specific light emission directions may be the closest unit-specific light emission direction to the left of the momentary flight direction and the closest unit-specific light emission direction to the right of the momentary flight direction.

The navigation light system may have a controller which is configured to operate the plurality of light emission units, as laid out herein. In particular, the controller may be coupled to each of the plurality of light emission units for controlling the plurality of light emission units individually. The controller may receive the momentary flight direction and may have a memory in which the unit-specific light emission directions for the plurality of light emission units are stored. The momentary flight direction may be provided by a flight direction sensor and/or may be provided from another entity, such as from a central flight control unit of the unmanned aerial vehicle.

The unmanned aerial vehicle may be an unmanned aerial vehicle that is capable of flying into various directions. In particular, the unmanned aerial vehicle may be capable of flying forward, backward, sideways towards the left, sideways towards the right, and into various directions in between forward, backward, sideways towards the left, and sideways towards the right. The forward direction may be defined in an arbitrary manner or may be a particularly favorable flight direction of the UAV.

The unmanned aerial vehicle may be a multicopter type unmanned aerial vehicle. In particular, the unmanned aerial vehicle may comprise between 3 and 10 rotors, in particular between 4 and 8 rotors, further in particular 4 rotors or 8 rotors. The latter numbers of rotors refer to the unmanned aerial vehicle being a quadrocopter or octocopter.

The term unmanned aerial vehicle (UAV) encompasses all aerial vehicles that are capable and allowed to fly without a pilot on board. While the unmanned operation is the intended operation and the standard operation, the term unmanned aerial vehicle does not exclude the aerial vehicle to be designed to transport passengers at selected times. In particular, the unmanned aerial vehicle may be a so-called air taxi that is capable of transporting passengers, but that is unmanned in between instances of passenger transport.

According to a further embodiment, the navigation light system is configured to operate selected ones of the plurality of light emission units as momentary forward light emission units, for which an angle between the momentary flight direction of the unmanned aerial vehicle and the respective unit-specific light emission direction is below a threshold angle. The momentary forward light emission units may in particular be the two light emission units, whose unit-specific light emission directions are closest to the momentary flight direction. Relating the momentary flight direction of the unmanned aerial vehicle to the unit-specific light emission directions of the plurality of light emission units is an effective way of determining those light emission units, whose unit-specific light emission directions are closest to the momentary flight direction. The angle between the momentary flight emission direction and the respective unit-specific light emission direction and the threshold angle may be absolute values. The angles of the unit-specific light emission directions towards the left and towards the right of the momentary flight direction may be treated in an analogous manner. The angle between the momentary flight direction of the unmanned aerial vehicle and the respective unit-specific light emission direction and the threshold angle may be defined/measured in the horizontal plane.

According to a further embodiment, the navigation light system is configured to operate the momentary forward light emission units with a light intensity of at least 300 cd, in particular with a light intensity of at least 500 cd. With the high intensity red light output and the high intensity green light output of the momentary forward light emission units yielding a high intensity white flight direction indicator light output due to color mixing, a strong alert of an oncoming UAV is given around the momentary flight direction of the UAV. High attention may be drawn to an oncoming UAV. The given light intensity values may be peak light intensity values in the light outputs of the light emission units. It is also possible that the given light intensity values are peak light intensity values in the overlap between the light outputs of the momentary forward light emission units. The white flight direction indicator light output may have a light intensity of at least 600 cd, in particular of at least 1000 cd.

According to a further embodiment, the navigation light system is configured to operate the forward light emission units with a light intensity of at most 1500 cd, in particular of at most 1000 cd. In this way, the white flight direction indicator light output may be kept within limits that prevent or at least provide a low risk of blinding observers that look at the oncoming UAV.

According to a further embodiment, the navigation light system is configured to operate those light emission units that are not momentary forward light emission units, given the momentary flight direction, with a light intensity of between 5 cd and 200 cd, in particular of between 10 cd and 100 cd, further in particular of between 20 cd and 50 cd. In this way, the light emission units that do not affect the white flight direction indicator light output may achieve a desired/required level of light intensity, as for example laid out in above cited sections of the FAR, in an efficient manner According to a further embodiment, the navigation light system is configured to operate the momentary forward light emission units in a flashing manner. The flashing white flight direction indicator light output may also be perceived as a strong alert of an oncoming UAV. The flashes may have a flash duration of between 50 ms and 500 ms, in particular of between 100 ms and 300 ms, further in particular of about 200 ms. The flashes may have a flash frequency of between 40 and 100 flashes per minute, in particular of between 50 and 80 flashes per minute, further in particular of about 60 flashes per minute. The flashes may have a light intensity as laid out above. In between the flashes, the momentary forward light emission units may be operated to emit lower levels of red/green light, in order to still contribute to the navigation light pattern around the unmanned aerial vehicle at those points in time. In particular, the momentary forward light emission units may be operated at such light intensity levels in between the flashes that a desired/required level of navigation light intensity, as for example laid out in above cited sections of the FAR, is maintained in between the flashes. It is stressed that the flashing operation of the momentary forward light emission units is an optional feature and that the momentary forward light emission units may also provide a continuous light output.

According to a further embodiment, the threshold angle is set as a function of an angular spacing of the unit-specific light emission directions of the plurality of light emission units. In this way, it may be ensured that those adjacent light emission units whose unit-specific light emission directions are to the right and to the left of the momentary flight direction are selected as the momentary forward light emission units. The angular spacing between the unit-specific light emission directions may be defined/measured in the horizontal plane. The threshold angle may be between 95% and 105%, in particular 100%, of the angular spacing of the unit-specific light emission directions of the plurality of light emission units. With the threshold angle being 100%, it may be ensured that exactly two momentary forward light emission units are selected for any given momentary flight direction. With the threshold angle being between 95% and 105% of the angular spacing, manufacturing tolerances regarding the unit-specific light emission directions and/or safety margins for preventing more than two light emission units being selected as momentary forward light emission units may be taken into account.

According to a further embodiment, the overlap between the light outputs of adjacent light emission units is at most 10°, in particular between 5° and 10°, further in particular about 10°. With the overlap being at most 10°, it may be ensured that the white flight direction indicator light output does not exceed the overlap exceptions of FAR section 25.1395, wherein the angular range of +/−10° with respect to the flight direction is unspecified. In particular, with the overlap being at most 10°, the overlap may be conveniently placed in the unspecified angular range of +/−10° and the navigation light system may act FAR-compliant for all momentary flight directions. In a particular embodiment, the overlap may be about 10°, the angular spacing between the unit-specific light emission directions may be about 10°, and the threshold angle may be about 10°. The overlap being between 5° and 10°, in particular about 10°, may allow for a substantial extension of the white flight direction indicator light output, providing an effective alert to observers that are in or close to the momentary flight direction. The overlap may be defined/measured in the horizontal plane.

According to a further embodiment, the plurality of light emission units comprise between 15 and 50 light emission units, in particular between 25 and 40 light emission unit, further in particular 36 light emission units. With these numbers of light emission units, a good compromise between granularity of the navigation light pattern, regulation-compliance of the navigation light pattern, substantial extension of the white flight direction indicator light output, and complexity in implementation may be achieved.

According to a further embodiment, the unit-specific light emission directions of the plurality of light emission units have a regular angular spacing around the unmanned aerial vehicle. The plurality of light emission units may be arranged in a rotationally symmetric or partially rotationally symmetric manner around the unmanned aerial vehicle. With the unit-specific light emission directions of the plurality of light emission units having a regular angular spacing, the navigation light system may be adapted particularly well to all momentary flight directions out of the 360° around the unmanned aerial vehicle. The regular angular spacing may refer to the angular spacing between the unit-specific light emission directions in the horizontal plane.

According to a further embodiment, the regular angular spacing is about 10° and the light outputs of the plurality of light emission units have an opening angle of about 20°. Further, the threshold angle may be about 10° and/or the overlap of the light outputs of adjacent light emission units may be about 10°. With these values, a good compromise between granularity of the navigation light pattern, regulation-compliance of the navigation light pattern, substantial extension of the white flight direction indicator light output, and complexity in implementation may be achieved. The term about may refer to a value between 95% and 105% of the stated value, in particular to a value between 98% and 102% of the stated value, further in particular to a value between 99% and 101% of the stated value.

According to a further embodiment, each of the plurality of light emission units comprises at least one optical element. In particular, each of the plurality of light emission units may comprise a refractive optical element and/or at least one shutter element. The at least one optical element may be provided to limit the opening angle of the light output of the light emission unit in question. In this way, the at least one optical element may limit the overlap between the light outputs of adjacent light emission units. Shutter elements may be provided between light sources of different light emission units, making such shutter elements act for two adjacent light emission units. The refractive optical elements of multiple light emission units may be integrated into larger refractive structures. For example, a ring shaped refractive structure may be provided that comprises refractive optical elements for all light emission units in an integrated manner. As another example, multiple integrated refractive structures, such as three or four integrated refractive structures, may be provided, with each of the integrated refractive structures comprising refractive optical elements for a subset of the plurality of light emission units. Such integrated refractive structures may have the shape of a sector of a ring.

According to a further embodiment, the plurality of light emission units are arranged in a single navigation light device. The single navigation light device may be arranged on an underside or an upper side of a body of the unmanned aerial vehicle. It is further possible that two navigation light devices, each providing a 360° navigation light pattern in a horizontal plane, are provided, with one being arranged on an underside of the body of the unmanned aerial vehicle and the other one being arranged on the upper side of the body of the unmanned aerial vehicle.

According to an alternative embodiment, the plurality of light emission units are arranged in a plurality of navigation light devices, in particular in three or four navigation light devices, with each of the plurality of navigation light devices comprising a respective subset of the plurality of light emission units. The plurality of navigation light devices may be arranged at positions remote from the body of the UAV. In particular, the plurality of navigation light devices may be arranged at rotor support arms of the UAV, i.e. at structures of the UAV that protrude from the body of the UAV. In this way, the navigation light devices may have a particularly unobstructed environment for emitting the navigation light pattern.

Exemplary embodiments of the invention further include an unmanned aerial vehicle, comprising a navigation light system in accordance with any of the embodiment described above. The additional features, modifications, and effects, as described above with respect to exemplary embodiments of the navigation light system, apply to the unmanned aerial vehicle in an analogous manner. The navigation light system may be substantially comprised of a single navigation light device that is mounted to the unmanned aerial vehicle in a suitable location, such as to an underside or an upper side of the body of the unmanned aerial vehicle. It is also possible that the unmanned aerial vehicle is equipped with two navigation light devices, with one of the navigation light devices being arranged on an upper side of the body of the unmanned aerial vehicle and with the other one of the navigation light devices being arranged on an underside of the body of the unmanned aerial vehicle and with both navigation light devices providing a 360° navigation light pattern around the unmanned aerial vehicle in the horizontal plane. It is further possible that the navigation light system is a distributed system, with the individual components being provided in different locations of the unmanned aerial vehicle and with the individual components jointly providing a 360° navigation light pattern around the unmanned aerial vehicle in the horizontal plane.

According to a further embodiment, the unmanned aerial vehicle is a multicopter type unmanned aerial vehicle. In particular, the unmanned aerial vehicle may comprise between 3 and 10 rotors, in particular between 4 and 8 rotors, further in particular 4 rotors or 8 rotors. The latter numbers of rotors refer to the unmanned aerial vehicle being a quadrocopter or octocopter.

Exemplary embodiments of the invention further include a method of operating a navigation light system of an unmanned aerial vehicle, such as a multicopter type unmanned aerial vehicle, the navigation light system comprising a plurality of light emission units, wherein each of the plurality of light emission units has a unit-specific light emission direction and is configured to provide a light output around the unit-specific light emission direction and wherein the light outputs of adjacent light emission units have an overlap, the method comprising: operating each of the plurality of light emission units depending on a relation between a momentary flight direction of the unmanned aerial vehicle and the respective unit-specific light emission direction; operating each of the plurality of light emission units to provide one of a red light output, a green light output, and a white light output for generating a navigation light pattern around the unmanned aerial vehicle providing a red sector, a green sector, and a white sector in accordance with the momentary flight direction of the unmanned aerial vehicle; and providing a white flight direction indicator light output with the overlap of the light outputs of adjacent light emission units at a border between the red sector and the green sector. The additional features, modifications, and effects, as described above with respect to exemplary embodiments of the navigation light system, apply to the method of operating a navigation light system in an analogous manner.

According to a further embodiment, the method comprises providing the white flight direction indicator light output with a light intensity of at least 600 cd, in particular of at least 1000 cd. The white flight direction indicator light output having such high light intensities may be achieved via a special operation of the momentary forward light emission units of the plurality of light emission units. In particular, the method may comprise selecting particular ones of the plurality of light emission units as momentary forward light emission units, in particular via above described threshold angle, and operating the particular ones of the plurality of light emission units with such light intensities that result in the white flight direction indicator light output having a light intensity of at least 600 cd, in particular of at least 1000 cd.

According to a further embodiment, the method comprises providing the white flight direction indicator light output in a flashing manner. The flashing white flight direction indicator light output may be achieved via a special operation of the momentary forward light emission units of the plurality of light emission units. In particular, the method may comprise selecting particular ones of the plurality of light emission units as momentary forward light emission units, in particular via above described threshold angle, and operating the particular ones of the plurality of light emission units in a flashing manner

BRIEF DESCRIPTION OF THE DRAWINGS

Further exemplary embodiments of the invention are described below with reference to the enclosed drawings, wherein.

DETAILED DESCRIPTION

Figure 1:
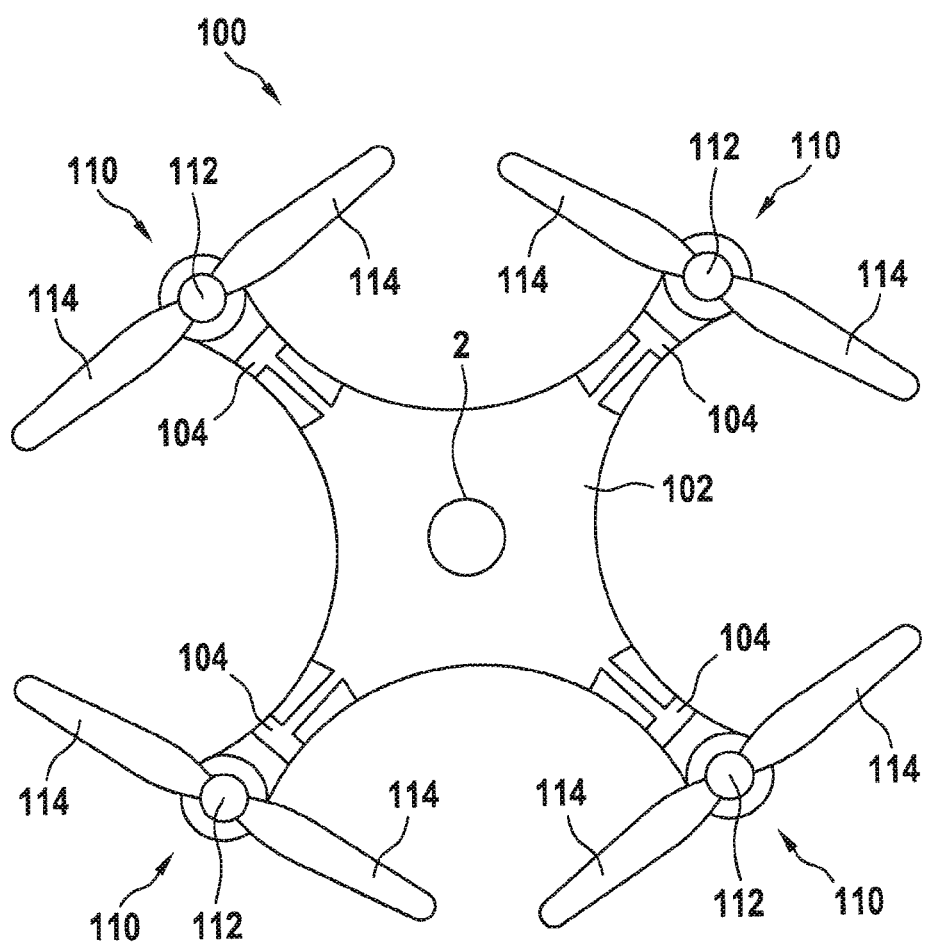
FIG. 1 shows an unmanned aerial vehicle in accordance with an exemplary embodiment of the invention in a schematic top view.

FIG. 1 shows an unmanned aerial vehicle (UAV) 100 in accordance with an exemplary embodiment of the invention in a schematic top view. The unmanned aerial vehicle 100 is a multicopter. In particular, the unmanned aerial vehicle 100 is a quadrocopter in the exemplary embodiment of FIG. 1, i.e. it has four rotors. The unmanned aerial vehicle may have a smaller or greater number of rotors, such as eight rotors, thus operating as an octocopter. The unmanned aerial vehicle may be an unmanned aerial vehicle at all times or may be a generally unmanned aerial vehicle, capable of temporarily transporting human passengers, such as an air taxi. The unmanned aerial vehicle may be remote controlled or may be autonomous.

The unmanned aerial vehicle 100 has a vehicle body 102. The vehicle body 102 may be configured for carrying utilities or delivery goods or any other kind of goods to be carried. The vehicle body 102 comprises four rotor support arms 104. Each of the four rotor support arms 104 supports a rotor 110.

Each of the four rotors 110 has a rotor hub 112 and two rotor blades 114. In the exemplary embodiment of FIG. 1, the two rotor blades 114 of each rotor 110 are separate elements, each element individually mounted to the rotor hub 112. The two rotor blades 114 of each rotor 110 may also be formed as an integrated structure and may be attached to the rotor hub 112 as a single integrated element. It is pointed out that the rotors 110 may have larger numbers of rotor blades as well.

In operation, the rotor blades 114 rotate around the rotor hub 112 and provide lift to the unmanned aerial vehicle 100. The rotating speed of the rotor blades 114 of the rotors 110 are controlled by a flight control unit of the unmanned aerial vehicle 100. By adapting the relative rotating speeds of the four rotors 110, the unmanned aerial vehicle 100 is steerable and can be flown into desired flight directions. The mechanics of flying and steering a multicopter are known to the skilled person. The multicopter design allows for the unmanned aerial vehicle 100 to fly into any desired direction in the drawing plane of FIG. 1. In other words, the unmanned aerial vehicle 100 may fly in any desired direction in a horizontal plane. Of course, the unmanned aerial vehicle 100 is also capable of flying upwards and downwards. The horizontal component of a current direction of motion of the unmanned aerial vehicle 100 is referred to as the momentary flight direction in the following.

A navigation light device 2 is mounted to the vehicle body 102, in particular to an upper central portion of the vehicle body 102. In FIG. 1, the navigation light device 2 is schematically shown as a structure having a circular outline in the depicted schematic top view. A further navigation light device 2 may be mounted to a lower central portion of the vehicle body 102. Jointly, the navigation light device 2 on the upper portion of the vehicle body 102 and the navigation light device 2 on the lower portion of the vehicle body 102 form the navigation light system of the unmanned aerial vehicle 100. The components of the navigation light device 2 and its operation will be described below.

Figure 2:
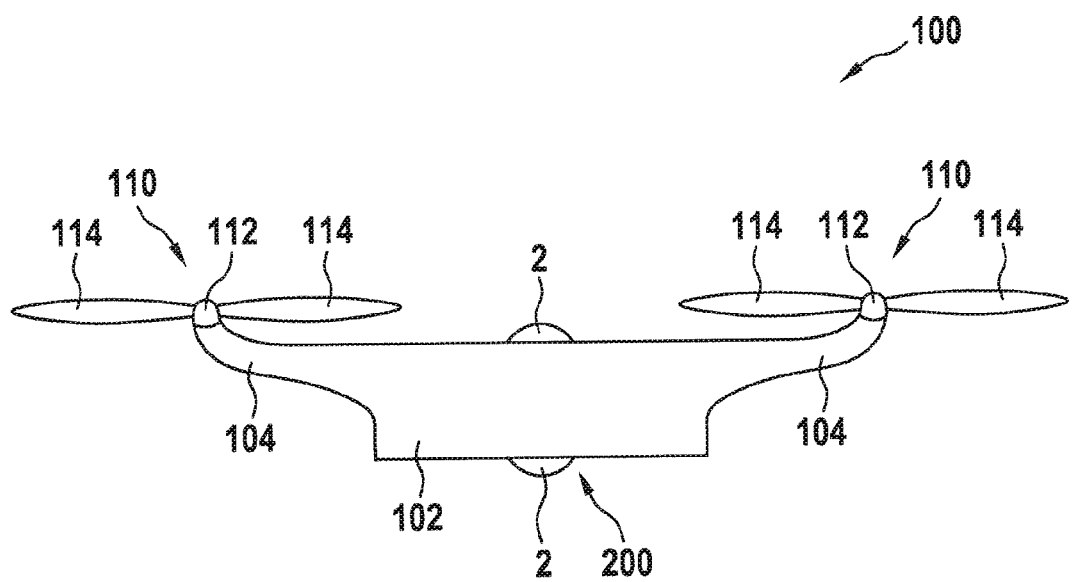
FIG. 2 shows the unmanned aerial vehicle of FIG. 1 in a schematic side view.

FIG. 2 shows the unmanned aerial vehicle 100 of FIG. 1 in a side view. As stated above, the unmanned aerial vehicle 100 is a quadrocopter, with two of the rotors being shown in the side view of FIG. 2. With respect to the description of the vehicle body 102, the rotor support arms 104, and the rotors 110, having rotor hubs 112 and rotor blades 114, reference is made to the description of FIG. 1 above.

The unmanned aerial vehicle 100 has an upper navigation light device 2, mounted to an upper portion of the vehicle body 102, and a lower navigation light device 2, mounted to a lower portion of the vehicle body 102. The upper navigation and lower navigation light devices 2 jointly form a navigation light system 200 of the unmanned aerial vehicle. In the exemplary embodiment of FIG. 2, the upper and lower navigation light devices 2 extend upwards/downwards from the upper/lower portion of the vehicle body 102. In particular, each of the upper and lower navigation light devices 2 has a dome-shaped lens cover, which extends above/beyond the vehicle body 102.

Figure 3A:
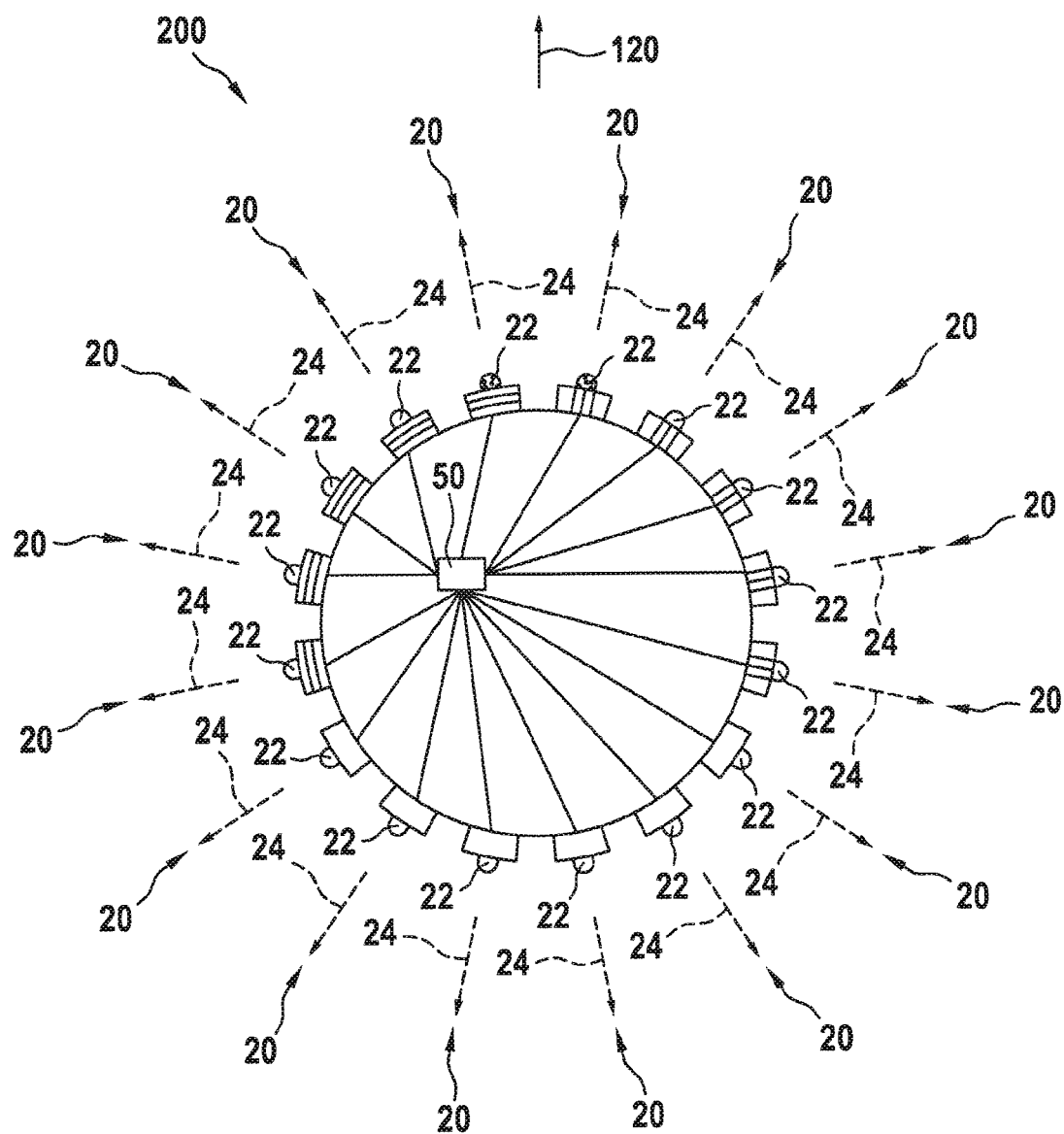
FIG. 3A shows selected components of a navigation light system in accordance with an exemplary embodiment of the invention in a schematic horizontal cross-sectional view, illustrating a first operating state for a first momentary flight direction.
Figure 3B:
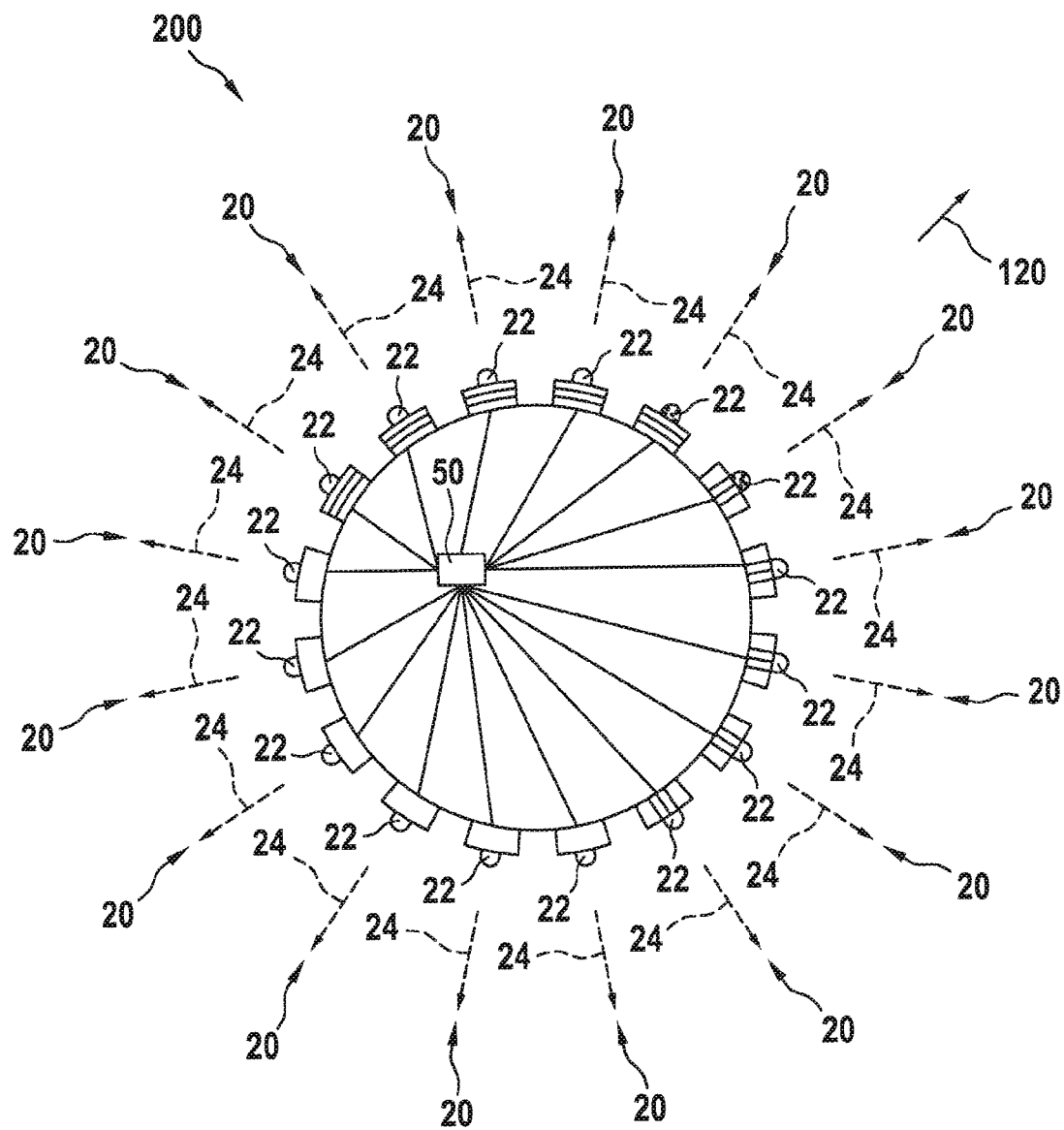
FIG. 3B shows the selected components of the navigation light system of FIG. 3A for a second operating state for a second momentary flight direction.

FIG. 3 shows selected components of a navigation light system 200 in accordance with an exemplary embodiment of the invention in a schematic horizontal cross-section. FIG. 3A and FIG. 3B illustrate the operation of the selected components for different momentary flight directions.

In particular, FIG. 3 depicts sixteen light emission units 20 of the exemplary navigation light system 200. Each of the sixteen light emission units 20 has a multi-color light source 22. Each multi-color light source 22 is capable of emitting red light, green light, and white light. Further, each of the sixteen light emission units 20 has a unit-specific light emission direction 24 and is configured to provide a light output around the unit-specific light emission direction. Further, each of the sixteen light emission units 20 has an optical system, comprising one or more optical elements, for shaping the respective light output from the light emitted by the respective multi-color light source. For ease of illustration, the optical elements are not depicted in FIG. 3. Exemplary optical elements will be described below with respect to FIG. 4.

The sixteen light emission units 20 jointly provide a navigation light pattern around the unmanned aerial vehicle, to which the navigation light system 200 is installed. The individual light outputs of the sixteen light emission units 20 overlap each other and jointly cover the 360° around the unmanned aerial vehicle. The properties of the individual light outputs will be described below with respect to FIG. 4.

The navigation light system 200 further comprises a controller 50, which is coupled to the multi-color light sources 22 of the light emission units 20. The controller 50 has information about a momentary flight direction 120 of the unmanned aerial vehicle and about the unit-specific light emission directions 24 of the light emission units 22. The controller 50 is configured to operate the multi-color light sources 22 depending on the momentary flight direction 120 and the associated unit-specific light emission directions 24. In particular, the controller 50 is configured to decide for each of the multi-color light sources 22 on the basis of the momentary flight direction 120 and the respective unit-specific light emission direction 24, whether the multi-color light source 22 emits red light, green light, or white light.

In the illustrated operating state of FIG. 3A, the unmanned aerial vehicle, to which the navigation light system 200 is installed, is flying upwards in the depicted drawing plane. This momentary flight direction is indicated with arrow 120. As FIG. 3A is a horizontal cross-sectional view, the momentary flight direction 120 is a horizontal momentary flight direction in the UAV frame of reference.

The controller 50 is configured to control the multi-color light sources 22 of those light emission units 20, whose unit-specific light emission direction 24 is within 0° and 110° clockwise from the momentary flight direction 120, to emit green light. As a consequence, five multi-color light sources 22 emit green light in the exemplary embodiment of FIG. 3. The emission of green light is indicated with three radial lines, drawn within the respective multi-color light sources 22 in FIG. 3A. The green light emissions of those multi-color light sources 22 form a green sector in a right forward direction with respect to the momentary flight direction 120.

The controller 50 is further configured to control the multi-color light sources 22 of those light emission units 20, whose unit-specific light emission direction 24 is within 0° and 110° counter-clockwise from the momentary flight direction 120, to emit red light. As a consequence, five multi-color light sources 22 emit red light in the exemplary embodiment of FIG. 3. The emission of red light is indicated with three transverse lines, as compared to the unit-specific light emission directions 24, drawn within the respective multi-color light sources 22 in FIG. 3A. The red light emissions of those multi-color light sources 22 form a red sector in a left forward direction with respect to the momentary flight direction 120.

The controller 50 is further configured to control the multi-color light sources 22 of those light emission units 20, whose unit-specific light emission direction 24 is more than 110° clockwise or counter-clockwise from the momentary flight direction 120, to emit white light. As a consequence, six multi-color light sources 22 emit white light in the exemplary embodiment of FIG. 3. The emission of white light is indicated by the respective multi-color light sources 22 being free of radial or transverse lines in FIG. 3A. The white light emissions of those multi-color light sources 22 form a white sector in a rearward direction with respect to the momentary flight direction 120.

Jointly, the plurality of light emission units 20 provide a navigation light pattern around the unmanned aerial vehicle, having a red sector, a green sector, and a white sector. In this way, the navigation light system 200 provides for a navigation light pattern that is similar to navigation light patterns that observers are used to from traditional air planes. The red sector, the green sector, and the white sector may satisfy the requirements for the horizontal light emission distribution, as given in Federal Aviation Regulations (FAR) sections 25.1387, 25.1389, 25.1391, and 25.1395.

In addition, the controller 50 is configured to identify the two light emission units 20, whose unit-specific light emission directions 24 are closest to the momentary flight direction 120. In the illustrated operating state of FIG. 3A, the two uppermost light emission units in the drawing plane of FIG. 3A are identified, as is indicated by a dotted pattern over part of the respective multi-color light sources 22. The identified light emission units are also referred to as momentary forward light emission units. In the exemplary embodiment of FIG. 3, the controller is configured to operate the momentary forward light emission units with a higher light intensity and/or in a flashing manner. The overlap of the light outputs of the momentary forward light emission units results in a color mixing of red light and green light and, thus, results in a white light output. With this white light output being around the momentary flight direction 120, the white light output is referred to as white flight direction indicator light output herein. With the light intensity of the light outputs of the momentary forward light emission units being higher than the light intensity of the light outputs of the other light emission units and/or with the momentary forward light emission units being operated in a flashing manner, a strong alert of an oncoming unmanned aerial vehicle is given around the momentary flight direction 120 of the unmanned aerial vehicle.

FIG. 3B shows the selected components of the navigation light system 200 of FIG. 3A in a different operating state. In particular, as compared to FIG. 3A, the unmanned aerial vehicle, to which the navigation light system 200 is installed, is flying in a different direction. This is indicated by the arrow 120, indicating the momentary flight direction of the UAV, pointing towards the top right instead of straight to the top in the drawing plane of FIG. 3. It is pointed out that the plurality of light emission units 20 are stationary in the UAV frame of reference and that the UAV frame of reference has the same relation to the drawing plane in FIG. 3B as in FIG. 3A. This is possible, because the UAV is capable of changing its momentary flight direction, without changing its attitude/orientation in space.

As laid out above, the controller 50 is configured to control the multi-color light sources 22 of the light emission units 20 depending on the momentary flight direction 120 and the unit-specific light emission directions 24. With the momentary flight direction 120 having changed from FIG. 3A to FIG. 3B, the controller controls other sets of multi-color light sources 22 to emit red light, green light, and white light. This is again illustrated in FIG. 3B by radial lines within the multi-color light sources 22 indicating green light outputs, by transverse lines within the multi-color light sources 22 indicating red light outputs, and by the absence of radial/transverse lines within the multi-color light sources 22 indicating white light outputs. Again, a navigation light pattern, having a red sector, a green sector, and a white sector, is provided in accordance with the momentary flight direction 120.

As also laid out above, the controller 50 is configured to identify the momentary forward light emission units and to operate said momentary forward light emission units with a higher light intensity and/or in a flashing manner. In FIG. 3B, the momentary forward light emission units are also indicated with a dotted pattern over part of the respective multi-color light sources 22. Again, the momentary forward light emission units are those light emission units, whose unit-specific light emission directions are closest to the momentary flight direction 120. With the color mixing of the red light output and the green light output of the momentary forward light emission units, a white flight direction indicator light output is again provided around the momentary flight direction 120.

From the discussion of FIGS. 3A and 3B, it is apparent that the navigation light system 200 is capable of providing a navigation light pattern around the unmanned aerial vehicle in accordance with the momentary flight direction of the UAV and that the navigation light system 200 is capable of providing a white flight direction indicator light output at the border between the red sector and the green sector, irrespective of what the momentary flight direction is.

It is pointed out that the number of sixteen light emission units 20 is exemplary only and that other numbers of light emission units are possible as well. In particular, higher numbers of light emission units may be employed in various applications, in order to provide a greater granularity for the navigation light pattern. With respect to FIGS. 4 and 5, an embodiment comprising 36 light emission units will be described.

It is further pointed out that the light emission units 20 may be arranged in a single navigation light device or that the light emission units 20 may be split up between multiple navigation light devices. In the latter case, multiple controllers may be provided for the multiple navigation light devices.

Figure 4:
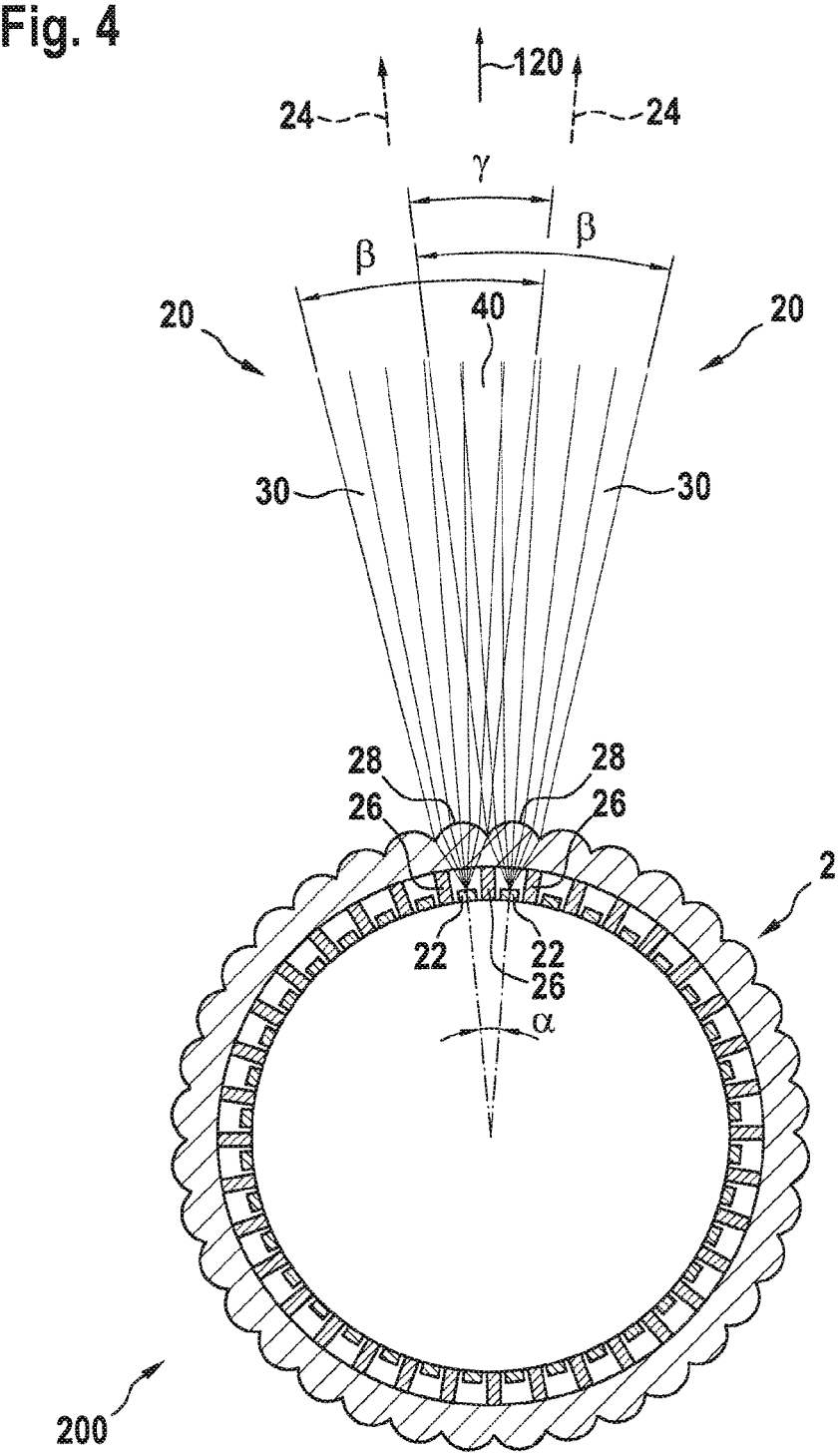
FIG. 4 shows selected components of a navigation light system in accordance with another exemplary embodiment of the invention in a schematic horizontal cross-sectional view.

FIG. 4 shows selected components of a navigation light system for an unmanned aerial vehicle in accordance with an exemplary embodiment of the invention in a schematic horizontal cross-sectional view. The selected components of the navigation light system are provided in an exemplary navigation light device 2. The navigation light device 2 may form the navigation light system by itself. It is also possible that two such navigation light devices form the navigation light system.

The selected components of the navigation light system, as depicted in FIG. 4, include 36 light emission units 20, with two of the 36 light emission units 20 being provided with reference numerals in FIG. 4 and being described in detail with respect to their light outputs, as illustrated via exemplary light rays. The 36 light emission units 20 are arranged with a regular angular spacing around the navigation light device 2. In particular, the 36 light emission units 20 are arranged in such a manner that the unit-specific light emission directions 24 have a regular angular spacing around the unmanned aerial vehicle. In the exemplary embodiment of FIG. 4, the unit-specific light emission directions 24 of adjacent light emission units 20 have an angular spacing of $\alpha=10°$.

Each of the light emission units 20 comprises a multi-color light source 22, capable of emitting red light, green light, and white light, and multiple optical elements, arranged and configured for shaping the light, as emitted by the multi-color light source 22, into a light output 30 of the light emission unit 20 in question. In the exemplary embodiment, each of the light emission units 20 comprises two shutter elements 26 and a refractive optical element 28. In the exemplary embodiment of FIG. 4, each of the shutter elements 26 acts as a shutter element for two adjacent light emission units 20. Further, in the exemplary embodiment of FIG. 4, the refractive optical elements 28 of the light emission units 20 are provided in the form of an integrated, ring shaped refractive structure.

The shutter elements 26 and the refractive optical element 28 of each light emission unit 20 jointly form the light output 30 of the light emission unit 20 in question. In particular, in the exemplary embodiment of FIG. 4, the shutter elements 26 and the refractive optical element 28 shape the light output 30 to have an opening angle $\beta=20°$ in the horizontal plane. Further, the refractive optical element 28 may be configured to provide for a fairly even light intensity across the opening angle $\beta$. The light outputs 30 of the light emission units 20 are provided around the respective unit-specific light emission directions 24.

The light outputs 30 of adjacent light emission units 20 have an overlap 40. In the exemplary embodiment of FIG. 4, the overlap 40 has an overlap angle $\gamma=10°$. In this way, the overlap angle $\gamma$ corresponds to the regular angular spacing $\alpha$ of the unit-specific light emission directions.

The annotated light emission units 20 of FIG. 4 are the momentary forward light emission units for the momentary flight direction 120, which is upwards in the drawing plane of FIG. 4. The navigation light system of FIG. 4 is configured to determine the momentary forward light emission units by comparing the angle between the momentary flight direction 120 and the respective unit-specific light emission angle 24 to a threshold angle. In the exemplary embodiment of FIG. 4, the threshold angle is 10°. By providing a threshold angle of 10°, this comparison ensures that the two light emission units, whose unit-specific light emission directions 24 are closest to the momentary flight direction 120, are identified as the momentary forward light emission units in a reliable and little complex manner.

In accordance with the principles laid out above with respect to FIG. 3, the right one of the annotated light emission units 20 of FIG. 4 emits green light for the depicted momentary flight direction 120 and the left one of the annotated light emission units 20 of FIG. 4 emits red light for the depicted momentary flight direction 120. In the overlap 40, the red light and the green light of the light outputs 30 mix to provide a white flight direction indicator light output. The two momentary forward light emission units may be operated at a particularly high light intensity and/or in a flashing manner, in order to draw a high level of attention to the unmanned aerial vehicle around the momentary flight direction 120.

Figure 5:
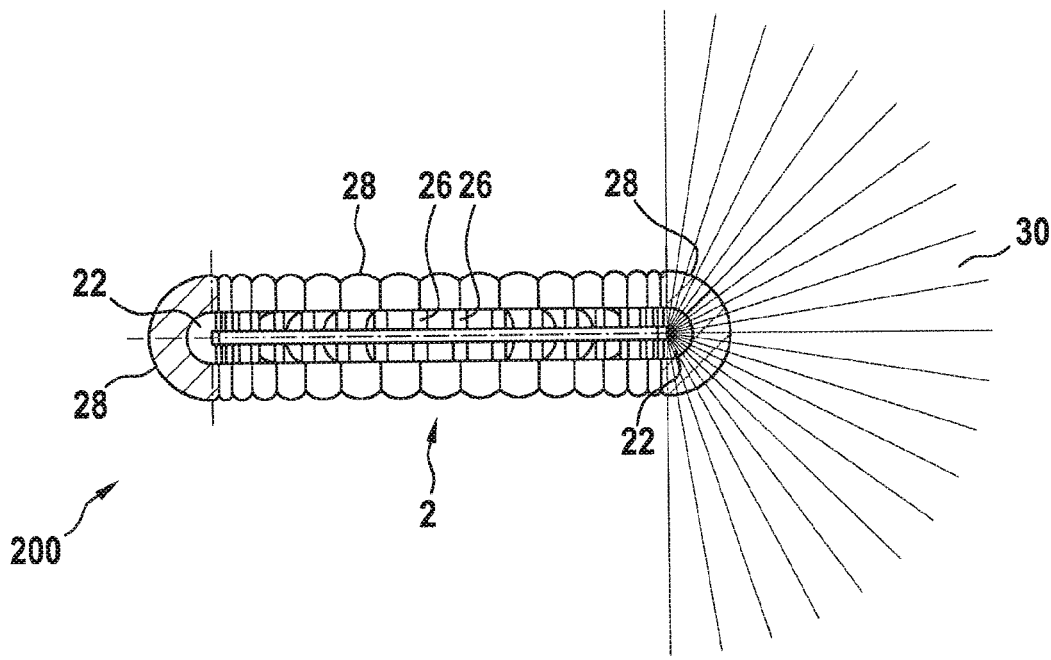
FIG. 5 shows the selected components of the navigation light system of FIG. 4 in a schematic vertical cross-sectional view.

FIG. 5 shows the selected components of the navigation light system of FIG. 4 in a schematic vertical cross-sectional view. The light output 30 is depicted via exemplary light rays for a single light emission unit 20, namely for the light emission unit 20 having the unit-specific light emission direction 24 towards the right in the drawing plane of FIG. 5.

As can be seen in FIG. 5, the light output 30 has an opening angle of about 180° in the depicted vertical cross-sectional plane. In case the navigation light device 2 is mounted to an underside or to an upper side of a vehicle body of an unmanned aerial vehicle, as depicted in FIGS. 1 and 2, about half of the total light output of the navigation light device may hit the vehicle body and may be wasted or reflected in potentially undesired directions. For this reason, the navigation light device 2 may be configured to provide the light outputs 30 of the light emission units 20 in only one of the upper hemisphere or the lower hemisphere. In the latter case as well as in the case of the light outputs 30 having an opening angle of about 180° in the vertical cross-sectional plane, two of the depicted navigation light devices may be provided on the unmanned aerial vehicle, namely one on the upper side and one on the underside of the unmanned aerial vehicle.

Figure 6:
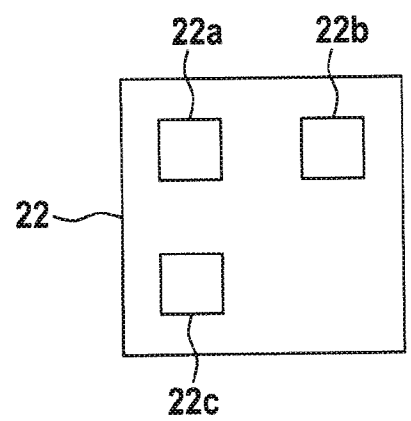
FIG. 6 shows an exemplary implementation of a multi-color light source in a schematic block diagram.

FIG. 6 shows an exemplary implementation of a multi-color light source 22 in a schematic block diagram. The multi-color light source 22 may be employed in the light emission units of the navigation light systems, as described herein. The multi-color light source 22 has a red light source 22a, a green light source 22b, and a white light source 22c. The red light source 22a is configured to emit red light, in particular aviation red light. The green light source 22b is configured to emit green light, in particular aviation green light. The white light source 22c is configured to emit white light, in particular aviation white light.

The red light source 22a, the green light source 22b, and the white light source 22c may in particular be LEDs.

The red light, as emitted by the multi-color light source 22, and the green light, as emitted by the multi-color light source 22, are such shades of red light and green light that they can mix to yield white light. It is possible that, when particular light emission units are identified as the momentary forward light emission units, the intensities of the red and green light emissions are adapted in such a manner that the color mixing yields white light. However, it is also possible that the red and green shades mix to yield white light, when emitted with their standard relative light intensities.

Figure 7:
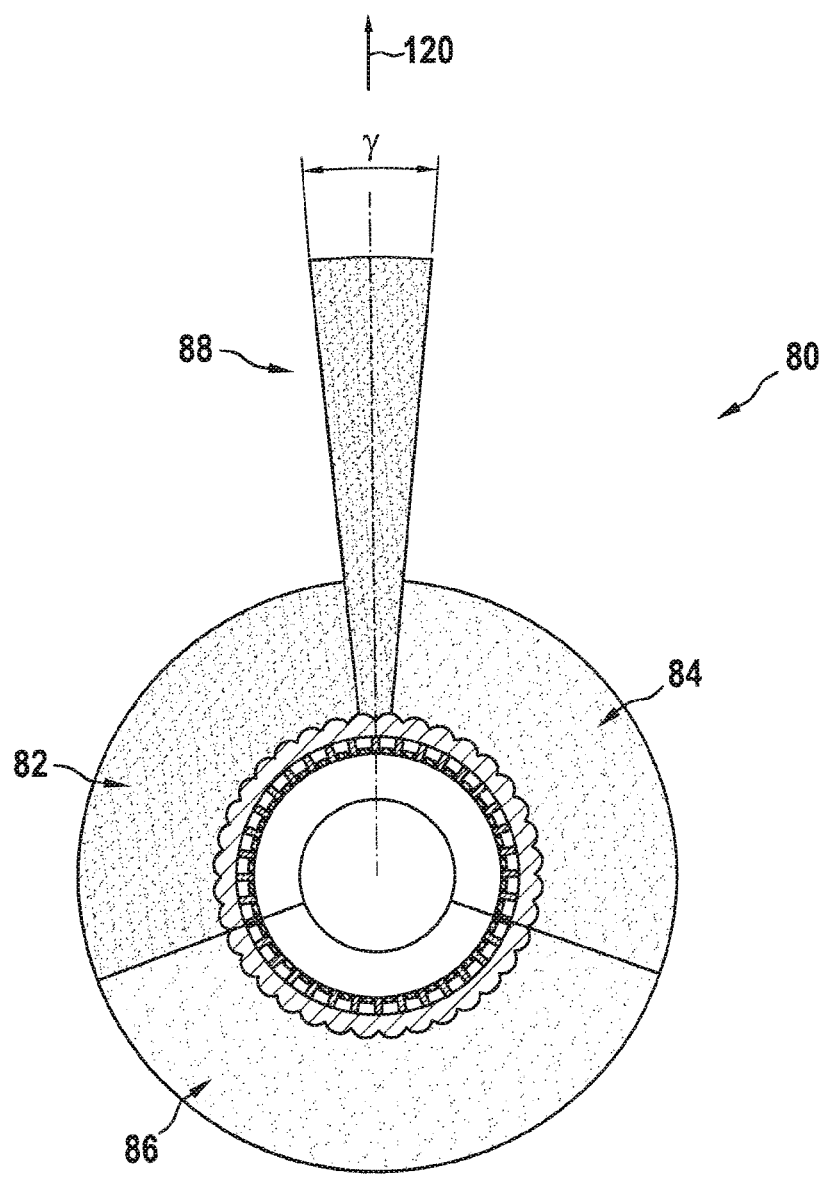
FIG. 7 shows an exemplary navigation light pattern, as may be provided in a horizontal plane by a navigation light system in accordance with an exemplary embodiment of the invention.

FIG. 7 shows an exemplary navigation light pattern 80, as may be provided in a horizontal plane by a navigation light system in accordance with an exemplary embodiment of the invention. The navigation light pattern 80 has a red sector 82, a green sector 84, a white sector 86, and a white flight direction indicator light output 88. The red sector 82, the green sector 84, the white sector 86, and the white flight direction indicator light output 88 are provided in accordance with the momentary flight direction 120, which is upwards in the drawing plane of FIG. 7.

As described above with respect to FIG. 4, the white flight direction indicator light output 88 extends over an overlap angle γ. The red sector 82 and the green sector 84 may extend over respective angular ranges of about 110°-α/2, and the white sector 86 may extend over an angular range of about 140°.

The white flight direction indicator light output 88 may have a light intensity that is substantially higher than the light intensities of the red sector 82, the green sector 84, and the white sector 86. For example, the peak light intensity in the white flight direction indicator light output 88 may be between 5 and 30 times, in particular between 10 and 20 times, as high as the peak light intensity in the portions of the red sector 82, the green sector 84, and the white sector 86 that are not illuminated by the momentary forward light emission units.

It is pointed out that the light intensities do not have to be constant over the red sector 82, the green sector 84, the white sector 86, and the white flight direction indicator light output 88. They may vary along the sectors, due to intended differing operations of the individual light emission units and/or due to uneven light outputs of the individual light emission units.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A navigation light system for a multicopter type unmanned aerial vehicle, comprising:
a plurality of light emission units, wherein each of the plurality of light emission units has a unit-specific light emission direction and is configured to provide a light output around the unit-specific light emission direction and wherein each of the plurality of light emission units comprises a multi-color light source capable of emitting red light, green light, and white light;
wherein the plurality of light emission units are arranged to jointly provide a navigation light pattern around the unmanned aerial vehicle and wherein the light outputs of adjacent light emission units have an overlap; and
wherein the navigation light system is configured to operate each of the plurality of light emission units depending on a relation between a momentary flight direction of the unmanned aerial vehicle and the respective unit-specific light emission direction, with the navigation light pattern around the unmanned aerial vehicle providing a red sector, a green sector, and a white sector in accordance with the momentary flight direction of the unmanned aerial vehicle and with the overlap of the light outputs of adjacent light emission units at a border between the red sector and the green sector providing a white flight direction indicator light output.

2. The navigation light system according to claim 1, configured to operate selected ones of the plurality of light emission units as momentary forward light emission units, for which an angle between the momentary flight direction of the unmanned aerial vehicle and the respective unit-specific light emission direction is below a threshold angle.

3. The navigation light system according to claim 2, configured to operate the momentary forward light emission units with a light intensity of at least 300 cd.

4. The navigation light system according to claim 2, configured to operate the momentary forward light emission units in a flashing manner.

5. The navigation light system according to claim 2, configured to operate the momentary forward light emission units with a light intensity of at least 500 cd.

6. The navigation light system according to claim 1, wherein the overlap between the light outputs of adjacent light emission units is at most 10°.

7. The navigation light system according to claim 1, wherein the plurality of light emission units comprise between 15 and 50 light emission units.

8. The navigation light system according to claim 1, wherein the unit-specific light emission directions of the plurality of light emission units have a regular angular spacing (α) around the unmanned aerial vehicle.

9. The navigation light system according to claim 8, wherein the regular angular spacing (α) is about 10° and wherein the light outputs of the plurality of light emission units have an opening angle (β) of about 20°.

10. The navigation light system according to claim 1, wherein each of the plurality of light emission units comprises at least one optical element, in particular a refractive optical element and/or at least one shutter element.

11. The navigation light system according to claim 1,
wherein the plurality of light emission units are arranged in a single navigation light device; or
wherein the plurality of light emission units are arranged in a plurality of navigation light devices, in particular in three or four navigation light devices, with each of the plurality of navigation light devices comprising a respective subset of the plurality of light emission units.

12. An unmanned aerial vehicle comprising a navigation light system in accordance with claim 1.

13. A navigation light system for a multicopter type unmanned aerial vehicle, comprising:
a plurality of light emission units, wherein each of the plurality of light emission units has a unit-specific light emission direction and is configured to provide a light output around the unit-specific light emission direction and wherein each of the plurality of light emission units comprises a multi-color light source capable of emitting red light, green light, and white light;

wherein the plurality of light emission units are arranged to jointly provide a navigation light pattern around the unmanned aerial vehicle and wherein the light outputs of adjacent light emission units have an overlap; and wherein the navigation light system is configured to operate each of the plurality of light emission units depending on a relation between a momentary flight direction of the unmanned aerial vehicle and the respective unit-specific light emission direction, with the navigation light pattern around the unmanned aerial vehicle providing a red sector, a green sector, and a white sector in accordance with the momentary flight direction of the unmanned aerial vehicle and with the overlap of the light outputs of adjacent light emission units at a border between the red sector and the green sector providing a white flight direction indicator light output, wherein the system is configured to operate selected ones of the plurality of light emission units as momentary forward light emission units, for which an angle between the momentary flight direction of the unmanned aerial vehicle and the respective unit-specific light emission direction is below a threshold angle;

wherein the threshold angle is set as a function of an angular spacing (α) of the unit-specific light emission directions of the plurality of light emission units, wherein the threshold angle is in particular between 95% and 105% of the angular spacing (α) of the unit-specific light emission directions of the plurality of light emission units.

14. A Method of operating a navigation light system of an unmanned aerial vehicle, the navigation light system comprising a plurality of light emission units, wherein each of the plurality of light emission units has a unit-specific light emission direction and is configured to provide a light output around the unit-specific light emission direction and wherein the light outputs of adjacent light emission units have an overlap, the method comprising:

operating each of the plurality of light emission units depending on a relation between a momentary flight direction of the unmanned aerial vehicle and the respective unit-specific light emission direction;

operating each of the plurality of light emission units to provide one of a red light output, a green light output, and a white light output for generating a navigation light pattern around the unmanned aerial vehicle providing a red sector, a green sector, and a white sector in accordance with the momentary flight direction of the unmanned aerial vehicle; and providing a white flight direction indicator light output with the overlap of the light outputs of adjacent light emission units at a border between the red sector and the green sector.

15. The method according to claim 14, comprising providing the white flight direction indicator light output with a light intensity of at least 600 cd.

16. The method according to claim 14, comprising providing the white flight direction indicator light output in a flashing manner.

* * * * *